3,112,203
METHOD OF PRODUCING A BONE-FREE MEAT PRODUCT
Desmond B. Watt, Naperville, Ill., assignor to Swift & Company, Chicago, Ill., a corporation of Illinois
No Drawing. Filed May 23, 1960, Ser. No. 30,774
11 Claims. (Cl. 99—107)

This invention relates to food products and, more particularly, to a method for mechanically separating the bone and cartilage from carcass goods in order to produce a bone-free, raw meat product.

Heretofore in the packing industry meat has been separated from bones by hand-boning methods; that is, bones and cartilage have been manually cut from the meat tissue and then scraped of as much residual meat as possible. This method has been both expensive and inefficient in producing a bone-free meat product, especially concerning the residual meat. Other methods have been suggested for overcoming the difficulties of hand boning. Notably, it has been suggested that the meat and bone could be mechanically ground and comminuted to a very fine emulsion wherein the bone material would not be removed but would be in a digestible form.

Another process has been suggested wherein the meat with bone is cooked, to loosen the meat, and mechanically comminuted and centrifuged to separate the loosened meat tissue from the bone and cartilage. In the latter process, cooking is a necessary step to separate the meat tissue from the bone. However, this entails a significant disadvantage because the protein in the resultant meat product is coagulated. Unfortunately, there is only a limited need or use for such a cooked and comminuted product. The cooked meat product is not suitable for sausage production (the sausage industry being probably the largest consumer of comminuted meat) because the coagulated cooked meat loses its binding properties. Sausage manufacture necessarily requires that coagulation take place during the processing, whereby the descrete meat particles are bound into a coherent mass. Where the meat is previously exposed to a cooking step, coagulation of the meat protein is already accomplished and cannot be reversed or repeated.

Therefore, it is a primary object of this invention to provide an improved method for mechanically separating bone and cartilage material from raw meat tissue.

A further object of the invention is to provide an improved method for producing a comminuted meat product free of bone and cartilage.

An additional object of this invention is to provide a method for producing a raw meat product free of bone and cartilage material.

A still further object of this invention is to provide a method for mechanically separating raw meat tissue from bone and cartilage material by selective comminuation so as to produce a raw meat product.

A still further object of this invention is to provide a method for freeing meat tissue from bone and cartilage without necessitating the cooking of the meat tissue.

Further objects and advantages of the invention will be apparent from the following description.

The method essentially comprises a series of breaking and comminuting steps to reduce animal carcass material to relatively small units wherein substantial quantities of meat tissue remain connected to bone and cartilage particles (hereafter referred to simply as bone particles) but wherein said bone particles do not exceed approximately ¼ to ⅜ inch in average diameter. These steps are performed upon raw carcass material, while the temperature thereof is held to about 68° F. or below to minimize bacteria growth and spoilage. During comminuting a substantial quantity of water is added to the material, and subsequently the watered comminuted material is violently agitated and chopped into a slurry. During the latter step substantially all of the meat tissue is severed from the bone particles and reduced in size while the bone particles are essentially unaffected. The slurry is then processed to separate and classify the bone and cartilage material and the liquid effluent containing finely divided raw meat tissue. The effluent is then dewatered in one or more operations, leaving a raw meat product available for use in sausage manufacture or the like.

The method may be practiced using commercially available packing-house equipment. Initially, raw carcass goods from the cooler are subdivided into large primal cuts and then shredded to manageable size in a "pre-breaker." This step reduces the pieces of bone and cartilage to particles in the range of ½ to 1½ inches average diameter, with substantial quantities of meat tissue remaining attached thereto. This material is then further subdivided to reduce the maximum bone particles to a size not exceeding about ⅜-inch average diameter and preferably about ¼-inch average diameter. This reduction may be effectively carried out by adding a substantial amount of water to the meat and bone and running the material through in a "hammer-mill" type apparatus such as a "disintegrator." Normally hammermills are available with a screen size ranging from ⅛-inch to 1-inch diameter openings. For this method the screen size is limited to the larger openings, preferably ⅝-inch diameter. It has been found that raw material fed through such an apparatus can be reduced to pieces wherein the maximum bone particles are in the range of about ¼-inch average diameter with substantial quantities of meat tissue still connected. The pieces of tissue remaining connected to the bone particles vary widely in size.

It is desirable to add quantities of water as the material is fed into the hammer-mill since operation of such equipment imparts work to the raw product and tends to raise the temperature thereof. The quantity of water is regulated to at least maintain the discharged material at or below about 68° F. Preferably the total amount of cool water added is about twice the weight of the raw carcass material. The watered and comminuted material is then violently chopped into a slurry while concurrently being agitated, to sever the connective tissue and free the raw meat from the bone particles. It has been found possible to subject the particles, produced as above described, to selective comminution when in slurry form; that is, the slurry allows the relatively harder constituents, such as bone and cartilage, to be moved out of the path of the comminuting member without substantial reduction in size; while the softer raw meat material will not move as freely and will be ripped and torn and otherwise further subdivided. The raw meat tissue in practice is reduced to small emulsifiable particles often in the micron range.

In order to perform this selective comminuation step the quantity of water previously added to make up the slurry may be somewhat varied and/or supplemented, provided that: (1) sufficient total water is added to form a slurry having a fluidity enabling the harder particles to be moved from the path of the agitating member; (2) the amount of water added is sufficient to allow for later classification and separation of the materials as by centrifugal force (it is also possible to permit some of the larger bone particles to settle out of the slurry); and (3) sufficient water at an appropriate temperature is added to maintain the temperature at or below 68° F. throughout the remainder of the process. However, excessive water should be avoided since the meat also contains water-soluble protein, a great deal of which may be lost if excessive quantities of water are used.

A suspension-type chopper such as the "Schnellkutter," described in Patent No. 2,918,956, operated at about 3300 r.p.m., has been found suitable for performing the selective comminution step. This apparatus comprises a vessel having a plurality of separately rotatable high speed cutting knives and stirring paddles suspended therein for operation about a vertical shaft.

After selectively comminuting the raw material, the slurry is processed to separate the large bone and cartilage particles from the fine particles of meat tissue. The slurry is fed, for example, into a centrifuge and spun at about 1800 r.p.m. (the speed is dependent in great part upon the quantity of water added to the mixture). Generally separation and classification in the centrifuge is facilitated when larger quantities of water are added in the preceding step. Substantially all of the bone and cartilage material, with only a minor amount of the finely divided meat material, is thereby separated from the slurry. This material may be pressed into cakes and used, for instance, in glue manufacture. The remaining slurry containing substantially only meat tissue particles is then dewatered by a suitable means such as a disk-type separator. The resultant meat tissue discharged therefrom may be used directly in the preparation of meat emulsion formula for sausage manufacture.

In the preferred method, after the bone material is separated and classified from the slurry containing meat tissue, it is subjected to the action of a proteolytic enzyme such as bromelin or papain to extract the minor amount of protein material removed therewith. This extracted protein may be used in the preparation and canning of cooked meat products and is useful in the preparation of meat stocks. The remaining bone material may be useful in animal feed and/or fertilizer manufacture or the like. The slurry containing finely divided meat tissue is dewatered as described above, and the liquid discharged from the disk-type centrifuge is further concentrated by an evaporation step which extracts additional water and allows recovery of the water soluble protein. So long as the meat tissue is not raised to a temperature of above about 120° F., the material will remain substantially raw, retaining its coagulating properties and thereby remaining useful as an ingredient for emulsion formula in sausage manufacture.

As an example, 10.37 pounds of unboned small animal carcass material was divided into small primal cuts by hand and passed through a coarse screen hammer-mill wherein approximately twice the weight in water, 22.88 pounds, was added. Batches of the resultant slurry were chopped in a 25-pound capacity suspension type meat cutter known as a "Schnellkutter" (similar to that described in Patent 2,918,956) at about 3200 r.p.m., while constantly stirred, for about one minute. Bone and cartilage sludge was then separated from the slurry in a bottle-type centrifuge. The wet sludge amounted to about 2.25 pounds leaving 31.00 pounds of meat slurry which was dewatered in a disk type separator. About 8.31 pounds of wet meat material was recovered from the separator.

During the course of the process small samples of the material were removed for inspection. The liquid from the separator was further processed to extract the soluble protein by low temperature spray drying. Spray drying was carried out under 28 inches of vacuum at a temperature between about 70°–72° F. About two hours were required to dry approximately 22.48 pounds of liquid effluent leaving 2.26 pounds of a thick syrupy chocolate colored protein condensate analyzed as containing about 20% protein and 80% water.

Both meat and protein concentrate fractions were combined in a sausage formula and subsequently stuffed into casings, cooked, and smoked. Since common sausage formulae require about 30% of added moisture before cooking, the minor amount of water with the meat was carried over from the separation steps without disadvantage. The resultant product displayed a promising appearance showing satisfactory color and coagulation characteristics for bologna and frankfurter production.

Obviously many modifications and variations of the invention as hereinbefore set forth may be made without departing from the spirit and scope thereof, and therefore only such limitations should be imposed as are indicated in the appended claims.

I claim:

1. The method of producing a bone-free raw meat product said method comprising: subdividing bone-containing meat into relatively small particles of bone with meat shreds remaining connected thereto; adding a substantial amount of water to said particles to form a slurry; violently agitating the slurry in a manner to cause the meat shreds to be further comminuted and detached from the bone particles without appreciably reducing the size of said bone particles; separating the detached bone particles from the liquid slurry containing comminuted meat; and dewatering said slurry to recover the comminuted meat material.

2. The method of producing a bone-free raw meat product, said method comprising: subdividing bone-containing meat into relatively small particles of bone having an average diameter in the range of ¼ to ⅜ inch with meat shreds remaining connected thereto; adding a substantial amount of water to said particles to form a slurry; violently agitating the slurry in a manner to cause the meat shreds to be further comminuted and detached from the bone particles without appreciably reducing the size of said bone particles; separating the detached bone particles from the liquid slurry containing comminuted meat; and dewatering said slurry to recover the comminuted meat material.

3. The method of producing a bone-free raw meat product, said method comprising: subdividing bone-containing meat into relatively small particles of bone with meat shreds remaining connected thereto while adding water in an amount of about twice the weight of said bone-containing meat to said particles to form a slurry; stirring said slurry and simultaneously chopping at high speed the bone and meat material therein whereby to selectively further comminute and detach the meat material, the meat shreds to be further comminuted and detached from the bone particles without appreciably reducing the size of the latter; separating the detached bone particles from the liquid slurry containing comminuted meat; and dewatering said slurry to recover the comminuted meat material.

4. The method of producing a bone-free raw meat product, said method comprising: subdividing bone-containing meat into relatively small particles of bone having an average diameter in the range of ¼ to ⅜ inch with meat shreds remaining connected thereto; adding water in an amount of about twice the weight of said bone-containing meat to form a slurry; stirring said slurry and simultaneously chopping at high speed the bone and meat material therein whereby to selectively further comminute and detach the meat material from the bone particles without appreciably reducing the size of the latter; separating the detached bone particles from the liquid slurry containing comminuted meat; and dewatering said slurry to recover the comminuted meat material.

5. The method as taught in claim 1 wherein the liquid material resulting from the dewatering step is spray dried to recover at least a portion of the soluble protein dissolved therein.

6. The method as taught in claim 2 wherein the liquid material resulting from the dewatering step is spray dried to recover at least a portion of the soluble protein dissolved therein.

7. The method as taught in claim 3 wherein the liquid material resulting from the dewatering step is spray dried to recover at least a portion of the soluble protein dissolved therein.

8. The method as taught in claim 4 wherein the liquid material resulting from the dewatering step is spray dried to recover at least a portion of the soluble protein dissolved therein.

9. The method of producing a bone-free raw meat product, said method comprising: subdividing bone-containing meat into relatively small particles of bone having an average diameter in the range of ¼ to ⅜ inch with meat shreds remaining connected thereto; adding water in an amount of about twice the weight of said bone-containing meat to form a slurry; violently agitating the slurry in a manner to cause the meat shreds to be further comminuted and detached from the bone particles without appreciably reducing the size of said bone particles; centrifuging the slurry to separate the detached bone particles; and dewatering the remaining slurry to recover the comminuted meat material while maintaining the temperature in all of said preceding steps to not exceed about 68° F.

10. The method of producting a bone-free raw meat product, said method comprising: subdividing bone-containing meat into relatively small particles of bone having an average diameter in the range of ¼ to ⅜ inch with meat shreds remaining connected thereto; adding water in an amount of about twice the weight of said bone-containing meat to form a slurry; violently agitating the slurry in a manner to cause the meat shreds to be further comminuted and detached from the bone particles without appreciably reducing the size of said bone particles; centrifuging the clurry to separate the detached bone particles; dewatering the remaining slurry to recover the comminuted meat material therefrom while maintaining the temperature in all of said preceding steps to not exceed about 68° F.; and spray drying the liquid component removed in said dewatering step at about 72° F. and in a vacuum of about 28 inches of mercury to recover at least a portion of the soluble protein dissolved therein.

11. The method of separating edible bone-free raw meat material from bone-containing meat, said method comprising: subdividing bone-containing meat into relatively small particles of bone with meat shreds remaining connected thereto; adding a substantial amount of water to said particles to form a slurry; violently agitating the slurry in a manner to cause the meat shreds to be further comminuted and detached from the bone particles without substantially reducing the size of said bone particles; separating the detached bone particles from the liquid slurry containing comminuted meat; treating said separated bone particles with a proteolytic enzyme to extract any residual protein matter therein; and dewatering said liquid slurry to recover the comminuted meat material therefrom.

References Cited in the file of this patent

UNITED STATES PATENTS

| | | |
|---|---|---|
| 2,761,479 | Geisler et al. | Sept. 4, 1956 |
| 2,798,251 | Lott | July 9, 1957 |
| 2,799,584 | Robertson | July 16, 1957 |
| 2,895,162 | Harris | July 21, 1959 |
| 3,028,243 | Robertson et al. | Apr. 3, 1962 |